(12) United States Patent
Mougin et al.

(10) Patent No.: US 10,175,036 B2
(45) Date of Patent: Jan. 8, 2019

(54) METHOD OF MEASURING AT LEAST ONE DIMENSION OF AN OBJECT

(71) Applicant: ROLEX SA, Geneva (CH)

(72) Inventors: Christian Mougin, Bienne/Biel (CH); Philippe Jacot, Bevaix (CH); Olivier Perrinjaquet, Savagnier (CH)

(73) Assignee: ROLEX SA, Geneva (CH)

( * ) Notice: Subject to any disclaimer, the term of this patent is extended or adjusted under 35 U.S.C. 154(b) by 6 days.

(21) Appl. No.: 15/193,775

(22) Filed: Jun. 27, 2016

(65) Prior Publication Data

US 2017/0003112 A1     Jan. 5, 2017

(30) Foreign Application Priority Data

Jul. 2, 2015   (EP) .................................. 15174953

(51) Int. Cl.
  *G01B 11/14*     (2006.01)
  *G01B 11/00*     (2006.01)
  *G01B 11/24*     (2006.01)

(52) U.S. Cl.
  CPC .......... *G01B 11/00* (2013.01); *G01B 11/2433* (2013.01)

(58) Field of Classification Search
  CPC ......... G01B 11/00; G01B 11/02; G01B 11/04; G01B 11/043; G01B 11/046; G01B 11/2433
  See application file for complete search history.

(56) References Cited

U.S. PATENT DOCUMENTS

| 4,895,449 A * | 1/1990 | Marshall .............. G01B 11/046 356/638 |
| 5,166,820 A * | 11/1992 | Fujita ..................... G01B 11/00 235/462.35 |
| 5,897,611 A * | 4/1999 | Case ...................... G01B 11/00 356/400 |
| 6,218,673 B1 * | 4/2001 | Gore .................. G01N 21/4795 250/473.1 |
| 9,733,193 B2 * | 8/2017 | Kyriakis ................ G01N 21/86 |
| 2002/0041381 A1 | 4/2002 | Akishiba |

(Continued)

FOREIGN PATENT DOCUMENTS

FR     2 646 904 A1     11/1990
JP    2008-102040 A      5/2008

OTHER PUBLICATIONS

European Search Report and Written Opinion dated Dec. 14, 2015 issued in counterpart application No. EP15174953; w/ English partial translation and partial machine translation (23 pages).

*Primary Examiner* — Michael A Lyons
(74) *Attorney, Agent, or Firm* — Westerman, Hattori, Daniels & Adrian, LLP (57) ABSTRACT

Method of measuring at least one dimension (L) of an object (1) having a first axis (2), the method including the use of a first optical system (11) including an optical sensor (111) and having a second optical axis (113), the measuring method including (i) obtaining at least one series of data from the optical sensor when the object is in movement relative to the first optical system, notably an angular movement of the first axis relative to the second axis and/or a movement of the object in rotation about the first axis and/or a movement of the object in translation along the second axis and (ii) processing the at least one series of data to quantify said at least one dimension.

22 Claims, 7 Drawing Sheets

(56) References Cited

U.S. PATENT DOCUMENTS

| | | | |
|---|---|---|---|
| 2003/0223082 A1* | 12/2003 | Trantow | G01B 5/205 |
| | | | 356/601 |
| 2004/0104360 A1* | 6/2004 | Pirinoli | G01B 11/046 |
| | | | 250/559.24 |
| 2005/0099636 A1* | 5/2005 | Schweser | G01B 11/02 |
| | | | 356/601 |
| 2012/0170049 A1 | 7/2012 | Doran | |
| 2012/0194673 A1 | 8/2012 | Kawa | |
| 2015/0233703 A1* | 8/2015 | Martini | G01B 11/043 |
| | | | 356/28 |

\* cited by examiner

METHOD OF MEASURING AT LEAST ONE DIMENSION OF AN OBJECT

BACKGROUND ART

The invention concerns an optical method of measuring at least one dimension of an object. It also concerns a method of manufacturing an object, notably a machining method, employing the measuring method. It further concerns an object produced by the method of manufacture referred to above. It finally concerns a timepiece movement or a timepiece, notably a wristwatch, including such an object.

The development of machine tools aims to improve accuracy, via the reduction of machining errors. As one of a number of examples there may be cited mechanical timepieces, where the aim is still and always to improve the accuracy of the manufacture of the components in order to improve the performance of the movements and the throughput of the assembly production line. Other examples concern the automotive, medical, space, aeronautic and electronics industries.

This search for improvement is made difficult by the working conditions of machine tools. This is particularly true for bar turning machines whether of the cam type or numerically controlled, but also for all other machines using a process of removing material, in particular by the formation of swarf. It proves difficult to improve further the intrinsic accuracy of these machines by the usual means, such as optimizing the architecture or the accuracy of the guides. In fact, residual machining errors, like errors caused by thermal distortion, static distortion, non-repeatable positioning of mobile elements (devices supporting the tools) and wear of the tools, have reached a minimum threshold that it appears difficult to go beyond. These residual errors remain too large for some applications, such as watchmaking, however.

Machine tools are ill-equipped for improving performance by installing in-situ sensors, as the latter are severely compromised by the severe environment brought about the presence of the cutting liquid and swarf. A number of ways have previously been examined to improve repeatability performance using sensors that measure the workpieces, the position of the tools or certain mobile elements of the machine during the production process, and afterwards exploiting these measurements to control or to correct the machine in real time.

Machine tools, such as bar turning machines (but also lathes, transfer machines, etc) generally include one or more devices for correcting machining errors noted during the production of the workpieces. These devices are either numerical tool correctors in the case of a numerically controlled machine tool or micrometer screw devices in the case of cam-type machines. Corrections are generally made manually by the operative monitoring the machine on the production line.

There exist various systems for measuring the mobile machine elements, such as position sensors that are mounted on the spindles of the machines, for example, such as LVDT inductive sensors or optical rules, for example. These sensors do not measure the dimensions of the manufactured workpiece, however.

There are also solutions that directly measure the workpiece, such as laser barriers, for example, or other optical gauge systems, or systems using some other physical principle. In principle, this type of measurement works by triggering contact. The measurement is then "read" on the axis tracking systems of the machine tool. This approach of measurement via axis tracking sensors does not make it possible to achieve the required performance. Moreover, in the case of small workpieces, most of these solutions are highly "invasive" and therefore particularly difficult to implement.

To summarize, because of their intrinsic shortcomings, none of these measuring solutions makes it possible to achieve the resolution and the repeatability necessary for accurately measuring the sizes or the dimensions (diameters, lengths) of an object, and in particular of a timepiece component of the millimeter scale revolution object type.

The document JP2008102040 describes a measuring device for measuring the diameter and the concentricity of the various sections of a cylindrical workpiece by rotating the workpiece. No information is given on positioning the workpiece in the optical system.

The document FR2646904 describes a method of measuring the diameter of a cylindrical object along the object by a vertical displacement and a displacement in rotation. An illumination system and a detector of the one-dimensional type are used. There is no particular reference to positioning the object in the system.

The document US2002041381 describes a device for measuring the diameter and the concentricity of a cylindrical object in a telecentric type optical system with a combination of two sensors, one of the one-dimensional type, the other of the two-dimensional type. Positioning the object in the system is not a topic in this document.

The document US2012194673 describes a measuring system of the reflection microscope type with a table that can be moved along an optical axis in order to acquire a series of images at different working distances. This series of images makes it possible to determine the focal points of the various levels of the workpiece; an image is then taken at each position z of interest for measuring the dimensions of interest.

SUMMARY OF THE INVENTION

The object of the invention is to provide a measuring method making it possible to improve the accuracy of measuring manufactured objects, in particular objects manufactured by removing material or by depositing material. In particular, the invention proposes a method making it possible to perform a rapid, accurate and reliable measurement of a dimension of an object of small size, i.e. to render the measurement of a dimension of an object simpler and more reliable. Moreover, the invention proposes a method making it possible to produce an accurate measurement of a plurality of dimensions of the same object simultaneously and rapidly, in the production environment, either in the machining liquid or in a compatible liquid, without cleaning the object beforehand.

Point 1 below defines a measuring method in accordance with the invention.

1. A method of measuring at least one dimension of an object having a first axis, the method including the use of a first optical system including an optical sensor and having a second optical axis, the measuring method including:
    a step of obtaining at least one series of data from the optical sensor when the object is in movement relative to the first optical system, notably an angular movement of the first axis relative to the second axis and/or a movement of the object in rotation about the first axis and/or a movement of the object in translation along the second axis, and a step of processing the at least one series of data to quantify said at least one dimension.

Points 2 to 6 below define various embodiments of the method.

2. The measuring method as defined in the preceding point, wherein the optical sensor is associated with a telecentric lens).
3. The measuring method as defined in point 1, wherein the method includes the use of a collimated light source having a third optical axis or a telecentric lighting second optical system including a light source associated with a telecentric lens having a third optical axis, notably a third axis coinciding with the second axis.
4. The measuring method as defined in point 1, wherein a series of data includes a plurality of apparent values of the at least one dimension, each apparent value of the series of data being notably associated with a given, even unique, position of the object relative to the first optical system and/or wherein a plurality of series of data are obtained simultaneously from the optical sensor relating to a plurality of dimensions, notably on the basis of the same series of images and the same phase of movement of the object relative to the first optical system.
5. The measuring method as defined in point 1, wherein the processing includes determining the value of the at least one dimension by calculation based on the apparent values of the at least one dimension, the calculation including calculation of the mean of the apparent values and/or calculation including interpolation of the apparent values, notably polynomial interpolation.
6. The measuring method as defined in point 1, wherein the step of obtaining the at least one series of data is carried out when the object is immersed in a liquid, notably in a machining liquid or in a liquid of similar chemical nature, the data being obtained through at least one wall of the container and through the liquid.

Point 7 below defines a measuring device in accordance with the invention.

7. A device for measuring at least one dimension of an object having a first axis, the device including:
   a first optical system including an optical sensor associated with a telecentric lens having a second optical axis,
   an element for acquiring data from the optical sensor,
   an element for processing the data, the device including an element for moving the object relative to the first optical system, notably an element for angular movement of the first axis relative to the second axis and/or an element for movement of the object in rotation about the first axis and/or an element for movement of the object in translation along the second axis.

Points 8 to 10 below define various embodiments of the measuring device.

8. The measuring device as defined in point 7, including a collimated light source having a third optical axis or a telecentric lighting second optical system including a light source associated with a telecentric lens having a third optical axis, notably a third axis coinciding with the second axis.
9. The measuring device as defined in point 7, wherein the first and second axes are orthogonal or substantially orthogonal.
10. The measuring device as defined in point 7, wherein the measuring device includes a container intended to receive a liquid, notably a machining liquid or a liquid of similar chemical nature, this container having at least one transparent wall.

Point 11 below defines a measuring method in accordance with the invention.

11. A method of measuring at least one dimension of an object linked to a machine, notably a machine tool, via a support, the method including the use of a first optical system including an optical sensor associated with a lens and a container containing a liquid, notably a machining liquid or a liquid of similar chemical nature, in which the object is immersed, the measuring method including e acquisition of data representing the at least one dimension through at least one wall of the container and the liquid without previously removing the object from the machine.

Point 12 below defines a measuring device in accordance with the invention.

12. A device for measuring at least one dimension of an object, the device including:
   a first optical system including an optical sensor associated with a lens, and
   a container intended to contain a liquid, notably a machining liquid or a liquid of similar chemical nature, the container having at least one transparent wall.

Point 13 below defines a method of manufacture in accordance with the invention.

13. A method of manufacturing an object including; the use of the measuring method as defined in point 1.

Point 14 below defines an object in accordance with the invention.

14. A method of manufacturing an object including the use of the measuring method as defined in point 11.

Point 15 below defines a timepiece movement or a timepiece in accordance with the invention.

15. A method of manufacturing an object including the use of a measuring device as defined in point 7.

BRIEF DESCRIPTION OF THE DRAWINGS

The appended drawings represent by way of example one embodiment of a device in accordance with the invention and one embodiment of a measuring method in accordance with the invention.

DETAILED DESCRIPTION OF PARTICULAR EMBODIMENTS

Figure 1:
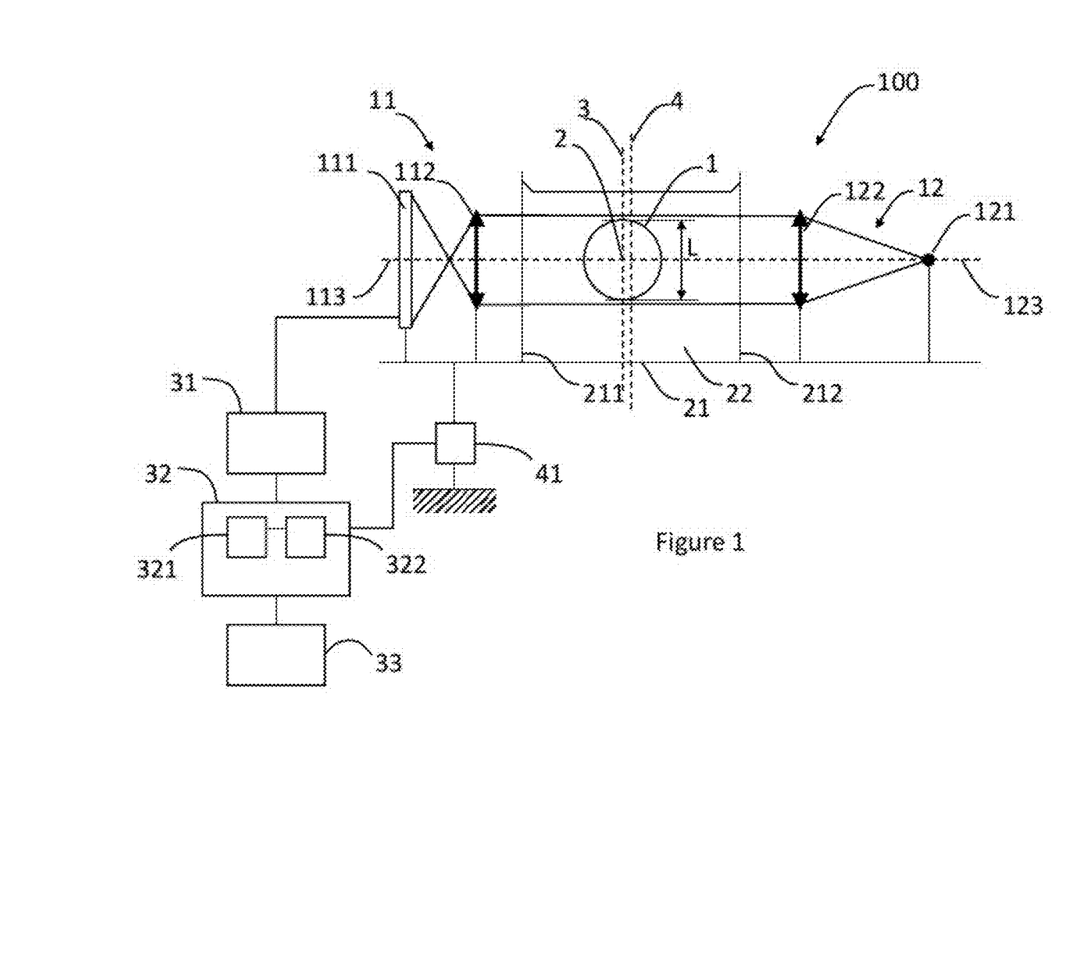
FIG. 1 is a diagram of one embodiment of a device in accordance with the invention.

One embodiment of a device 100 for measuring a dimension L of an object 1 or a workpiece is described hereinafter with reference to FIG. 1. The device, and the measuring method that is described later, are particularly suitable for measuring small components, notably millimeter scale objects of revolution, notably smaller than 10 mm, and can be used in a machine tool type environment. The device and the method are particularly suitable for measuring dimensions of timepiece components.

It is assumed that the object has a first axis 2, for example an axis of revolution. The device includes:
- a first optical system 11 having an optical axis 113, referred to hereinafter as the second optical axis 113, and including an optical sensor 111, preferably associated with a lens 112,
- an element 31 for acquiring data from the optical sensor,
- an element 32 for processing the data,
- an actuator 41 or element for moving the object relative to the first optical system, notably an element for angular movement of the first axis relative to the second axis and/or an element for movement of the object in rotation about the first axis and/or an element for movement of the object in translation along the second axis.

Instead of this or in addition to this the device for measuring the dimension L of the object 1 includes, in addition to the first optical system 11 including an optical sensor 111 associated with a lens 112:
- a container 21 intended to contain a liquid 22, notably a machining liquid or a liquid of similar chemical nature, the container having at least one transparent wall 211.

The measuring device advantageously includes a collimated light source having an optical axis 123, referred to hereinafter as the third optical axis 123, or a telecentric lighting second optical system 12 including a light source 121 associated with a telecentric lens 122 having an optical axis 123, referred to hereinafter as the third optical axis 123, notably a third axis coinciding with the second axis.

The optical sensor may be a two-dimensional optical sensor or a CMOS video camera or a CCD video camera.

The first and second axes are advantageously orthogonal or substantially orthogonal.

The optical sensor 111 is advantageously associated with a telecentric lens 112.

The measuring device is designed to be able to function in air or in an environment compatible with the machining environment. To be more precise, the measuring device makes it possible to effect a dynamic measurement involving movement of the object relative to the measuring plane of the 2D telecentric optical sensor. The measurement device is designed to function with the object in the open air or with the object immersed in a liquid. The object may be supported by a manipulator that allows relative movement thereof relative to the measuring plane of the sensor. The object can also be held by a spindle of the machine tool or by a holding device, for example, while the optical sensor or the measuring device is installed on a movement element 41 or actuator enabling it to move the measuring plane relative to the workpiece. Alternatively, instead of being held while it is being measured, the object could be free to move in the air or in a liquid bath.

The measuring device can be filled with liquid, notably cutting oil or machining liquid or another fluid compatible with or of the same nature as the machining fluid without this degrading the measurement, provided that the fluid is clean and homogeneous. This is made possible by the fact that transparent walls 211, 212, notably formed by optical glass plates placed on each side of the container, are substantially or even totally identical. The device therefore becomes symmetrical from the point of view of the refractive indexes, the effect of which is that all the optical changes to which light entering the container is subjected are corrected on leaving it.

The processing element 32 includes a processor 321 and a memory 322. The processing element may also include elements for controlling the actuator 41.

The measuring device may also include a human-machine interface 33. The processing element 32 is then connected to the human-machine interface 33. The interface notably includes an element for displaying the calculated or determined value of the dimension L. The element may also display any other data, notably apparent values of the dimension and/or the dimensions and/or the calibration standard. The human-machine interface may further include an element for capturing data and commands.

The acquisition element and/or the processing element may be implemented in a computer. In particular, the acquisition element may include a first software module and/or the processing element may include a second software module. The human-machine interface 33 may be the human-machine interface of the computer.

One embodiment of a method of measuring a dimension L of the object 1 is described hereinafter with reference to FIGS. 3 to 6.

It is assumed that the object has a first axis 2, notably an axis of revolution.

The method includes the use of a measuring device as described above, notably the use of the first optical system 11 including the optical sensor 111 and having the second optical axis 113. The first optical system is adapted to form a clear image of the object on the sensor 111.

Figure 6:
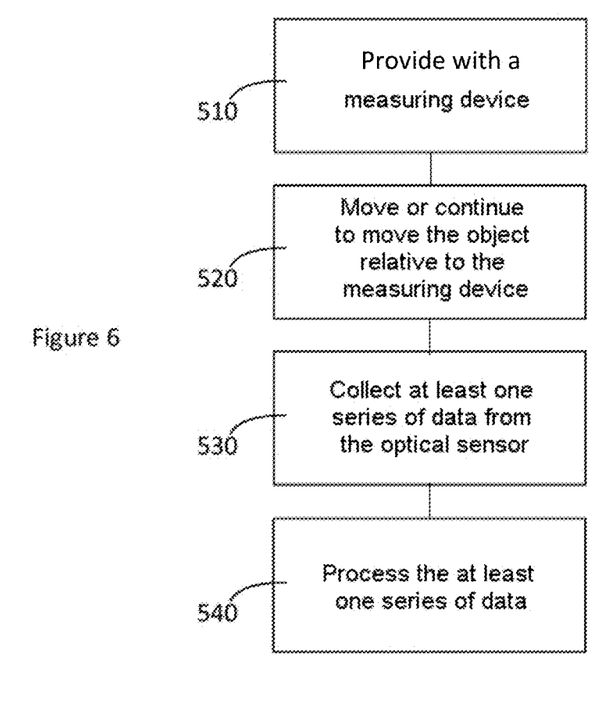
FIG. 6 is a flowchart of one embodiment of the measuring method in accordance with the invention.

Thus referring to FIG. 6 the measuring device 100 is provided in a first step 510 of the method. The measuring device may be provided in situ, i.e. disposed and/or positioned relative to the workpiece without the setting of the latter relative to a machine being modified, the workpiece being in place on the machine in order to be shaped thereon by removal of material or by deposition of material. Alternatively, the measuring device may be provided such that the workpiece can be measured after shaping it by removal of material or by deposition of material, for example during the shaping of one or more subsequent workpieces. In particular, the machine may be a machine tool, notably a bar turning machine.

It is to be noted that this step of providing the measuring device may be executed at any time in the process of modifying the workpiece on the machine. It may be executed even before the workpiece has undergone modification on the machine. Instead of this or in addition to this it may be executed between two stages of modification of the workpiece on the machine, for example between two machining phases. Instead of this or in addition to this it may be executed after the workpiece has undergone one or more stages of modification on the machine. Alternatively, the step of providing the measuring device may be executed once machining has been completed and the workpiece has been removed from the machine.

During this step 510 there is advantageously placed in the container of the measuring device a liquid such as a machining liquid, a cleaning liquid or a liquid of similar chemical nature and/or compatible nature, i.e. a liquid that will have no impact on the workpiece or the process of shaping the workpiece employed in the machine after the workpiece has been immersed in this liquid. The measuring device is disposed relative to the workpiece and/or the machine so that the workpiece is immersed in the liquid in the container. The nature of the liquid is preferably such that the workpiece can be immersed in the liquid without it being necessary to clean the workpiece beforehand.

For example, the workpiece is held by one or more mandrels and/or one or more clamps and/or one or more spindles and/or a holding system, for example, such as a vacuum holding system, for example.

In a second step 520, the workpiece continues to move or is caused to move relative to the measuring device, notably relative to the first optical system. The movement advantageously includes rotation of the workpiece about the first axis 2. This movement of the workpiece is preferably produced by rotation of the mandrel or mandrels and/or the clamp or the clamps and/or the spindle or the spindles and/or the holding system referred to above. This movement is produced by the machine, for example. Alternatively, this movement is produced by an auxiliary device associated with the machine. Instead of this or in addition to this a device enables the measuring device to be moved relative to the workpiece.

In addition to this, the workpiece may be moved so that its first axis 2 is displaced angularly relative to the second axis 113, notably around a fourth axis 3 or around an axis substantially parallel to this fourth axis 3. This movement preferably includes angular sweeping of a sector such that during this sweeping the first axis 2 and the second axis 113 are at least temporarily orthogonal. This movement is produced by the machine, for example. Alternatively, this movement is produced by an auxiliary device associated with the machine. Instead of this or in addition to this, the actuator 41 can enable the measuring device to be moved relative to the workpiece.

Also in addition to this, the workpiece may be moved in translation along the second axis 113 relative to the measuring device, in particular relative to the first optical system 11. This movement preferably includes sweeping a segment such that during this sweeping the workpiece is at least temporarily at an optimum working distance from the first optical system 11. This movement is produced by the machine, for example. Alternatively, this movement is produced by an auxiliary device associated with the machine. Instead of this or in addition to this, the actuator 41 of the measuring device may allow movement of the measuring device relative to the workpiece.

In a third step 530 at least one series of data from the optical sensor is collected while the object is in motion relative to the first optical system, as explained above. In fact, the illumination data received, at different times, at the level of the various pixels of the optical sensor 111 is sent to the data acquisition element 31. There is obtained at the output of this acquisition element at least one series of data comprising a plurality of apparent dimensions or values of the at least one dimension L that it is required to quantify. The processing carried out at the level of this acquisition element is known to the person skilled in the art. It makes it possible to determine a distance separating two pixels of the optical sensor corresponding to the image of two edges or two characteristic elements of the workpiece and to deduce from that distance an apparent value of a dimension of the workpiece given the optical system, notably the lens 112. In other words, a series of data corresponds to a series of apparent values of a dimension corresponding to different positions of the workpiece relative to the first optical system.

Advantageously, the element 41 for moving the object relative to the first optical system allows moving the object at a constant or at a substantially constant speed during step 530. Preferably, the element 41 for moving the object relative to the first optical system is not a stepping actuator or a actuator used as a stepping motor. In step 530, at least one series of data from the optical sensor is collected while the object is in motion relative to the first optical system. However, the data are not collected when the object is motionless, the object being moved between two successive phases of collecting data.

In this third step, at least one series of data is therefore advantageously obtained while the object is immersed in the liquid 22. The data is therefore obtained through the wall 211 of the container 21 and through the liquid. If a second optical system 12 is present, the light rays have also passed through the wall 212 of the container.

In addition to this, the step of obtaining data further includes obtaining at least one second series of data relating to a calibration standard 91, 92 or a pin gauge. This second series of data concerns a calibrated dimension that is therefore known precisely and makes it possible, in the subsequent processing step, to correct the series of data comprising a plurality of apparent values of the at least one dimension L.

The step of obtaining data advantageously includes obtaining at least one additional series of data relating to at least one additional dimension L', L", . . . of the object. This at least one additional series of data may concern any dimension of the object, such as a diameter, a length, a width, a thickness, a depth, a height, comprising a plurality of apparent values of the dimension. A decisive advantage of the invention is that it makes it possible to acquire a plurality of series of data relating to the same dimension and/or relating to different dimensions during the same step of obtaining data, and therefore makes it possible to determine a plurality of dimensions in a single step.

In a fourth step 540, the at least one series of data is processed to quantify said dimension L. The processing includes determining the value of the dimension L by calculation based on the apparent values of the dimension L obtained previously.

The calculation may include calculation of the mean of the apparent values; in particular the value determined or calculated following the processing step may be the mean of the apparent values of the series of data.

Instead of this or in addition to this, the calculations may include interpolation of the apparent values, notably polynomial interpolation, and/or local extremum extraction. These calculations are known to the person skilled in the art.

Instead of this or in addition to this, the calculations may include correcting the apparent values on the basis of a second series of data concerning the calibrated dimension, which is therefore known precisely.

Optionally, in an additional step, the value of the dimension L or of the various dimensions may be used to control the machine tool, i.e. to correct the machining parameters in order better to target the required dimension values, using a servocontrol loop or closed loop.

The measurement is therefore effected in accordance with the following principles:
- The workpiece is moved relative to a measuring plane 4 associated with the first optical system 11 (and corresponding to the ideal working distance) so that the workpiece passes through a "perfect position", i.e. with the dimension to be measured in the measuring plane 4.
- Throughout the sequence of movement, the sensor of the measuring device collects a plurality of images (for example, 30 images per second) and the acquisition element extracts the required apparent values (apparent dimensions).
- The processing element determines the evolution of the apparent dimension as a function of the movement parameters of the workpiece relative to the measuring device and then proceeds to a numerical adjustment (fit), for example with a polynomial approximation of degree 2, 4, 6 or 8 according to the circumstances.

The evolution function, i.e. the relation linking the apparent dimension to data reflecting the position of the workpiece relative to the measuring device, features an extremum. The value of the extremum is extracted from the polynomial approximation and is then the measurement value retained, i.e. the measurement of the dimension.

Measuring the workpiece in dynamic movement makes it possible to circumvent errors in positioning the workpiece in the optical field, which are primarily of two types:
I. distortion of the apparent values as a function of the working distance;
II. buckling of the workpiece caused by its orientation in the optical field (the dimension to be measured not being perpendicular to the direction of the light rays used for the measurement).

Figure 3:
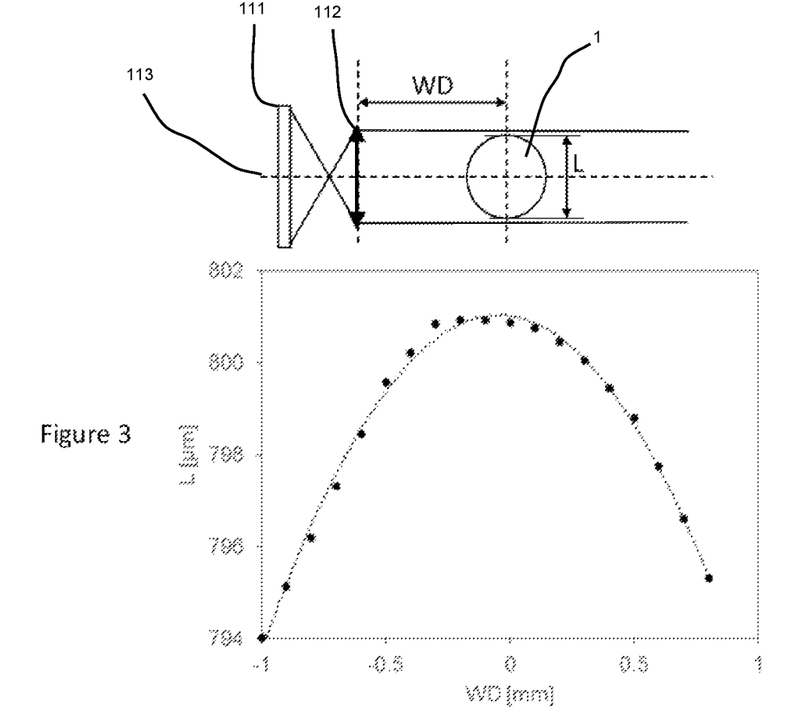
FIG. 3 is a graph showing the effect of the working distance on the apparent measurement.
Figure 4:
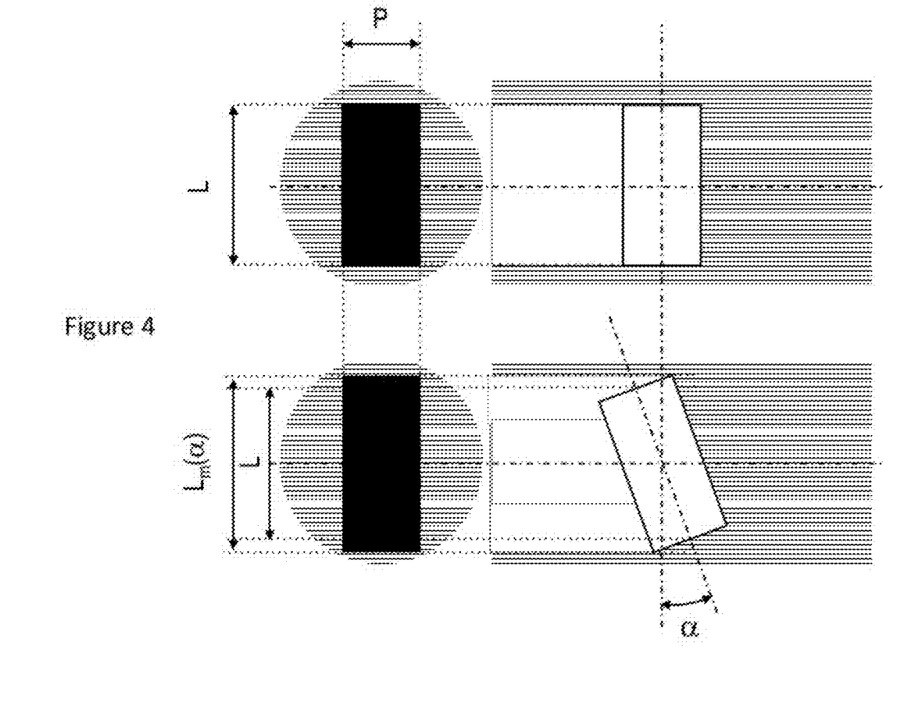
FIG. 4 is a schematic drawing showing the effect of the inclination on the apparent measurement of an object.
Figure 5:
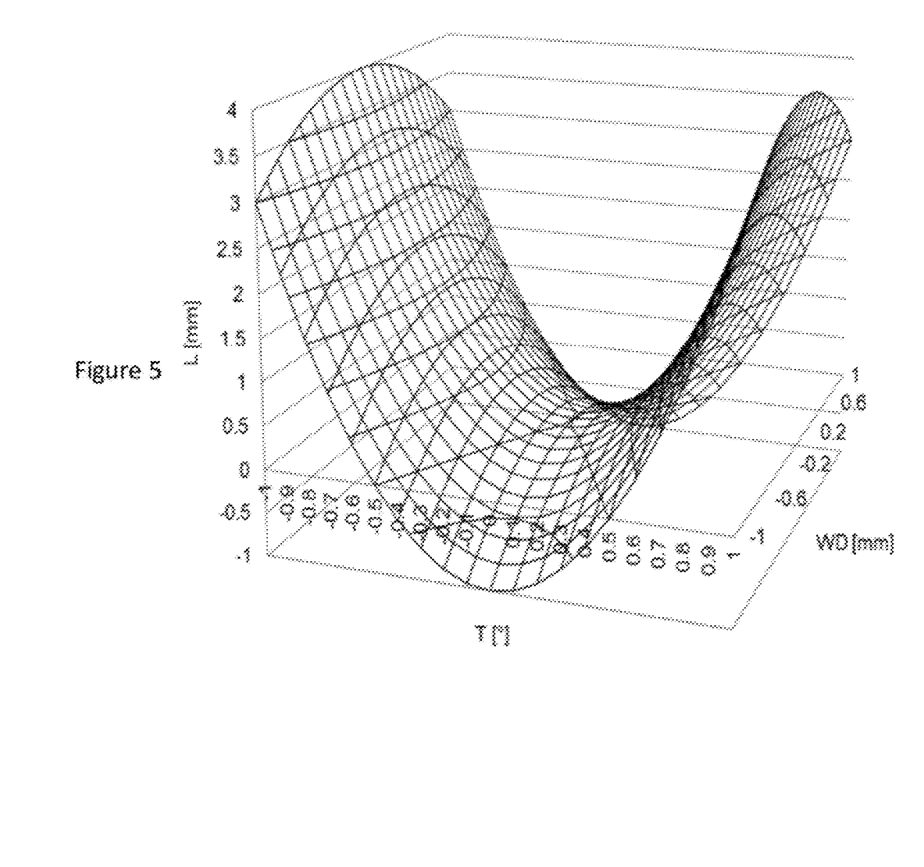
FIG. 5 is a graph showing the effect of the combination of the inclination and the working distance on the apparent measurement.

These various effects are shown in FIGS. 3 to 5 and will be described in more detail later.

The measurement may be done in a medium that makes it possible to alleviate the problems linked to the presence of a liquid film on the workpiece and on the optics of the measuring system. If it is covered with liquid, as is the case during and after machining, the workpiece to be measured is introduced into the container of the measuring device filled with a fluid that makes it possible to avoid having to clean and dry the workpiece.

The measuring method advantageously uses the first optical system 11 including the optical sensor 111 associated with the lens 112 and the container 21 containing the machining liquid 22 or liquid of similar chemical nature in which the object is immersed. The measuring method therefore advantageously includes the acquisition of dimension data through the wall 211 of the container and the liquid.

Again with advantage, the measuring method includes the use of the collimated light source having the third optical axis 123 or the telecentric illumination second optical system 12 including the light source 121 associated with the telecentric lens 122 having the third optical axis 123.

The collimated light source or the second optical system makes it possible to create an optical field with parallel rays. The object placed in that field blocks rays and an image in silhouette is therefore formed at the level of the sensor 111.

The invention also relates to a method of manufacturing an object including use of the measuring method described above and/or use of a measuring device as described above. The invention therefore also relates to a method of manufacture using the measuring method in accordance with the invention and/or the measuring device in accordance with the invention.

The invention relates further to an object 1 or a workpiece 1 produced using the method of manufacture described above.

Figure 7:
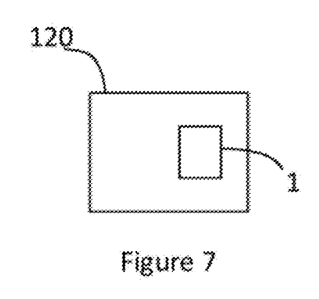
FIG. 7 is a diagram of a first embodiment of a timepiece in accordance with the invention.
Figure 8:
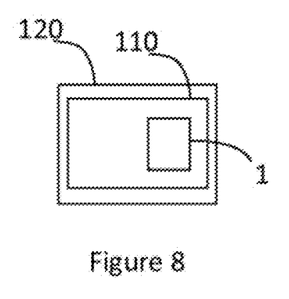
FIG. 8 is a diagram of a second embodiment of a timepiece in accordance with the invention.

The invention finally relates to a timepiece movement 110 or timepiece 120, in particular a wristwatch, including an object or a workpiece described above. FIGS. 7 and 8 represent diagrammatically first and second embodiments of a timepiece in accordance with the invention.

The solution is therefore compatible with the machining environment (cutting liquid) and makes it possible to measure, in situ or shortly after leaving the machine, within a few seconds, the diameters and the lengths of the machined workpieces with a resolution of the order of 0.015 µm and a repeatability of the order of ±0.2 to 0.5 µm.

Tests have been carried out with two types of device:
A Keyence TM-006 device including a telecentric optic having a magnification of 0.4× and a corresponding optical field 6 mm in diameter.
A device enabling integration of three magnifications of 0.5×, 1× and 2×, resulting in three sizes of optical field from 14×10.7 mm to 3.6×2.7 mm, with a video camera with 1628×1238 pixels (2 million pixels) and illumination by a stabilized green LED.

A test bench was used for a first characterization of the various devices used and to characterize the effect of the measuring environment, namely air, a cutting liquid and a benzene-type cleaning product. The workpiece 1 was held by two clamps 91 and 92 of calibrated diameter, serving as calibration standards and making it possible to carry out a reference measurement simultaneously with the measurement performed on the workpiece as shown in FIG. 2, for example, diameters D1 and/or D2 and/or lengths L1 and/or L2.

The measurement stability results confirm the Gaussian statistical nature of the measurements, which make it possible to use the mean value from a plurality of images as a measurement of dimensions. A long-term stability of ±0.1 µm (3 sigma on the measurement of a diameter) was obtained. The results of the repeatability tests comprise values below ±0.1 µm.

The characterization of the effect of the presence of the cutting liquid in the measuring device with a Blasomill B22 type machining liquid makes it possible to determine that the presence of machining liquid degrades the measurement but in an entirely acceptable manner. With measurements averaged over 60 images, the effect of the presence of liquid is virtually imperceptible in some cases, even using the maximum magnification of 2×, in principle that most sensitive to the presence of particles.

Figure 2:
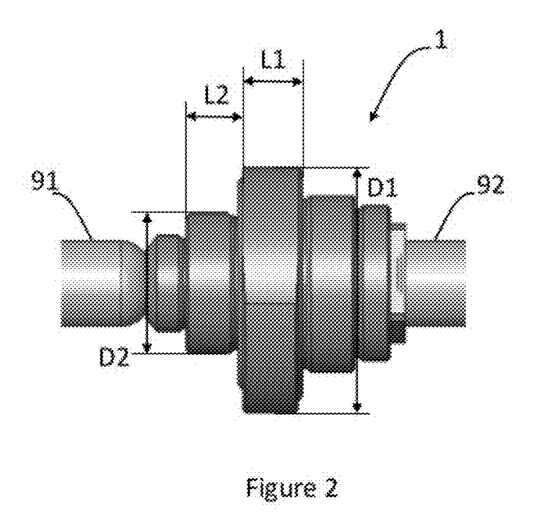
FIG. 2 is a side view of a workpiece to be machined mounted on a measurement support.

FIG. 2 shows a barrel arbor, which is a typical example of an object to be measured using the measuring device described above. Note the following typical characteristics of the objects that can be measured:
dimension of the objects from 1 mm to 20 mm;
dimension tolerance range from ±1 to ±50 µm;
broad typology of characteristics to be measured: length, span, diameter, chamfer, square, presence of a projecting element at the periphery of a workpiece, notably a revolution workpiece (for example a hook), etc.

Measurements taken with different means and in different environments show that the measured value (extracted by image analysis) is noisy, with a Gaussian distribution. The dispersion is small, much less than 1 µm. From 15 averaged measurements, the static repeatability (i.e. the repeatability without movement of the workpiece, with 60 seconds between measurements) reaches a range lower than 0.1 µm.

It is possible to measure the workpiece in air or in a container filled with a liquid, notably a machining or cleaning fluid, without seriously degrading the performance of the measuring device.

The effect of the liquid is perceptible at the level of the dispersion, which increases on average by 50%. The static repeatability remains within entirely acceptable levels. At the level of the measured values, the results after calibration are virtually identical to those in air.

If the position of the workpiece relative to the measuring device is modified, the measured values pass through optimum values that are the "true values" in the geometrical sense of the term (i.e. with truing and optical focusing). This makes it possible to circumvent errors caused by the positioning of the workpiece. The correct value in the metrological sense of the term can be obtained by calibrating the device. To this end, the device may be calibrated beforehand and/or afterwards, and a pin gauge or a calibration standard 91, 92 may be measured simultaneously, for example.

The effect of the distortion of the values as a function of the working distance is shown in FIG. 3. The graph indicates on the abscissa axis the working distance WD (expressed relative to the ideal working distance) and on the ordinate axis the apparent value measured when measuring at least one dimension L of a barrel arbor.

As illustrated on FIG. 4, the effect of buckling of the workpiece is caused by the dimension to be measured not being perpendicular to the light rays of the optical field used for the measurement. The dimension or the apparent dimension Lm of the dimension L is defined, as a function of the angle α formed by the dimension to be measured and the direction perpendicular to the optical axis and the depth P of the workpiece at the level of the dimension, by the equation:

$$Lm(\alpha)=L\cdot\cos(|\alpha|)+P\cdot\sin(|\alpha|).$$

The measured dimensions are subject to the effects mentioned above, which are combined linearly, i.e. are superposed:

Maximum or minimum at optimum working distance;
Minimum or maximum at zero inclination.

FIG. 5 shows an example of the geometrical effect (caused by the inclination T of the workpiece) and the effect of the working distance WD on the measurement. The effect is represented with the length difference relative to the nominal value, as a function of the angle of inclination of the workpiece plotted on the abscissa axis and the working distance plotted on the ordinate axis.

It is therefore seen that the measuring device makes it possible to determine in particular the diameters and lengths of a timepiece component of small size. The measurement is rapid and reliable, in particular thanks to image acquisition and dynamic measurement of dimensions with the workpiece in motion relative to the optical field of the device. The exact dimensions are determined afterwards by processing measurements effected on the various images. In the final analysis, on the basis of a multitude of fuzzy images, the measuring device makes it possible to deduce therefrom by mathematical processing a sharp image for each dimension to be measured. In other words, for the same dimension, a series of data defining a plurality of different values of the dimension is obtained from the optical sensor. That series is processed to obtain the exact value of the dimension.

The magnification of the optical system may be chosen so that the sensor is able to acquire an image of the whole of the object, without having to move the object or the sensor. Alternatively, the magnification of the optical system may be chosen so that the sensor is able to acquire an image of the portion of the object that includes the critical dimensions that it is required to measure.

As previously stated, the measurement may be effected in a liquid bath, for example a bath of machining fluid, which greatly simplifies the use of the device in an industrial production environment.

The measurement principle may be applied in particular to revolution components with cylindrical symmetry. Determining the concentricity of the workpiece by rotation of the component about its axis of symmetry can also be envisaged, likewise determining the dimensions of non-cylindrical or non-symmetrical portions, such as the square or the hook of a barrel arbor. The measurement of other types of workpieces is also possible of course.

In all the embodiments of the invention, the optical sensor may be a two-dimensional optical sensor or a CMOS video camera or a CCD video camera.

In all the embodiments of the invention, the step of obtaining data may include obtaining at least one series of data relating to a calibration standard 91, 92 or to a pin gauge.

In all the embodiments of the invention, the processing may include the determination of the value of the dimension by actuation based on the apparent values of the dimension, using at least one series of data relating to the calibration standard 91, 92 or to the pin gauge.

Throughout this document, by "dimension of an object" is meant in particular its length or its width or its depth or its thickness or its height or its diameter if it is an object having a revolution shape.

The proposed solution makes it possible:

To circumvent the unfavorable environment of the machining area of the machine tool, which generally degrades the accuracy and the repeatability of the measurements. This is achieved by measuring the workpiece directly in a fluid, which is either the lubrication or machining fluid used for machining or another fluid that is compatible or of a similar chemical nature. This method makes possible quality optical measurements: using the machining fluid as the measuring medium avoids the problems of cleaning the workpiece, errors that originate from interface problems on the workpiece to be measured (presence of a film of liquid on the workpiece), and problems linked to the cleanliness of the optic in the machining medium.

To perform a very large number of measurements per time interval (the measurement takes only a few tenths of a second) thanks to the use of a high-resolution, high-frequency video camera and very fast image analysis intelligence. This principle makes it possible to retain only the mean value of each required dimension or preferably to use the value of a curve of numerical fit of the measurements, in particular for workpieces of small size, or a combination of the two methods. This ensures that the results are highly reliable.

To measure dimensions (for example, diameters or lengths) of the workpiece using a collimated light source, a telecentric optic coupled to a high-resolution, high-frequency CCD or CMOS video camera and a kinematic system for manipulating the workpiece or the sensor enabling dynamic measurement of the workpiece. The dynamic measurement and the processing of the data make it possible to extract a measurement value corresponding to a "perfect" alignment of the workpiece and to eliminate optical focusing errors.

To perform the measurements of the dimension on the basis of a single series of images, without having to return to the "perfect" position corresponding in particular to the inclination and to the working distance that are the ideal (focal plane and zero inclination), to obtain the final value of the dimension to be measured. Such repositioning, which is implemented in existing measuring machines, often takes a long time, to the detriment of the efficacy of the machine, and is never perfect because of positioning errors inherent to the finite precision and to the hysteresis of the displacement means. This repositioning error leads to an inevitable measurement error on the final value of the dimension to be measured.

To perform measurements of a plurality of dimensions of the object at the same time, on the basis of the same series of images, by effecting a numerical fit to the various apparent dimensions as a function of the position of the object in the optical field (notably its inclination and working distance). There is therefore no requirement to acquire an image or a series of images specific to each dimension to be measured.

To achieve resolutions of the order of 0.015 µm. The resolution of the measurement depends on the optical magnification, the size of the pixels of the sensor of the video camera and the number of shades of grey available. The indicated resolution could be improved by improving the video cameras (higher pixel density) and the quality of the optics.

To circumvent any deviations of the measuring system through an onboard reference that is measured periodically. The rapidity of measurement in fact makes it possible to measure a calibration workpiece frequently and thereby to prevent most of the potential drifts of the measuring device itself (relative control or measurement). A measurement is therefore obtained relative to an extremely accurate calibration reference.

The measurement solution could notably be used in any machine tool that removes material or any machine that deposits material.

The measurement solution could also be used for closed loop servocontrol of the machine tool in order to limit and to correct the difference between the measured dimension and its setpoint value regardless of external interference or drift.

The advantages of the approach compared to existing devices are primarily:
 image acquisition is effected in motion;
 image acquisition (including measurement) is full-field (no kinematic or image summation);
 the possibility of inclining the workpiece relative to the optical system makes it possible to avoid the need for a support;
 the measurement is carried out in the same environment as the manufacturing process (machining, deposition of material).

The solution also has another significant advantage: it makes it possible to measure a plurality of dimensions at the same time, i.e. a single use of the method makes it possible to generate a plurality of series of data each relating to a different dimension (length, diameter, etc).

The combination of the movement of the workpiece and continuous image acquisition makes it possible to control:
 effects caused by the workpieces: diameter/length ratio, radii of tools, wear of tools, etc;
 measurement of lengths by seeking the minimum or maximum length as a function of the inclination.

The invention claimed is:

1. A method of measuring at least one dimension of an object having a first axis, the method including using a first optical system including an optical sensor and having a second axis which is an optical axis, the measuring method including:
 providing the object in movement relative to the first optical system,
 obtaining at least one series of data from the optical sensor while the object is in movement relative to the first optical system, wherein the at least one series of data includes a plurality of apparent values of the at least one dimension, and
 processing the at least one series of data so as to quantify the at least one dimension,
 wherein the obtaining of the at least one series of data is carried out when the object is immersed in a liquid, the data being obtained through at least one wall of a container and through the liquid.

2. The measuring method as claimed in claim 1, wherein the optical sensor is associated with a telecentric lens.

3. The measuring method as claimed in claim 1, wherein the method includes using a collimated light source having a third axis which is another optical axis or a telecentric lighting second optical system including a light source associated with a telecentric lens having a third axis which is an optical axis.

4. The measuring method as claimed in claim 1, wherein a plurality of series of data are obtained simultaneously from the optical sensor relating to a plurality of dimensions.

5. The measuring method as claimed in claim 1, wherein the processing includes determining a value of the at least one dimension by calculation based on apparent values of the at least one dimension, the calculation including calculation of a mean of the apparent values and/or calculation including interpolation of the apparent values.

6. The method according to claim 1, wherein the object is linked to a machine via a support, and wherein the data including a plurality of apparent values of the at least one dimension is acquired through the at least one wall of the container and the liquid without previously removing the object from the machine.

7. A method of manufacturing an object including:
 carrying out steps of manufacturing the object, and
 carrying out the measuring method as claimed in claim 1 on the object.

8. A method of manufacturing an object including:
 carrying out steps of manufacturing the object, and
 carrying out the measuring method as claimed in claim 6 on the object.

9. A device for measuring at least one dimension of an object having a first axis, the device including:
 a first optical system including an optical sensor associated with a telecentric lens having a second axis which is an optical axis,
 an element for moving the object relative to the first optical system,
 an element for acquiring at least one series of data from the optical sensor while the object is in movement relative to the first optical system, wherein the at least one series of data includes a plurality of apparent values of the at least one dimension,
 an element for processing the at least one series of data so as to quantify the at least one dimension,
 wherein the measuring; device includes a container intended to receive a liquid, the container having at least one transparent wall.

10. The measuring device as claimed in claim 9, including a collimated light source having a third axis which is an optical axis or a telecentric lighting second optical system including a light source associated with a telecentric lens having a third axis which is an optical axis.

11. The measuring device as claimed in claim 9, wherein the first and second axes are orthogonal or substantially orthogonal.

12. A method of manufacturing an object including:
 carrying out steps of manufacturing the object, and
 carrying out measuring at least one dimension of the object by the measuring device as claimed in claim 9.

13. A method of manufacturing an object including:
carrying out steps of manufacturing the object, and
carrying out measuring at least one dimension of the object, the object having a first axis, by a measuring method including using a first optical system including an optical sensor and having a second axis which is an optical axis, the measuring method including:
providing the object in movement relative to the first optical system,
obtaining at least one series of data from the optical sensor while the object is in movement relative to the first optical system, wherein the at least one series of data includes a plurality of apparent values of the at least one dimension, and
processing the at least one series of data so as to quantify the at least one dimension.

14. A method of manufacturing an object including:
carrying out steps of manufacturing the object, and
measuring at least one dimension of the object by a measuring device, the object having a first axis, the measuring device including:
a first optical system including an optical sensor associated with a telecentric lens having a second axis which is an optical axis,
an element for moving the object relative to the first optical system,
an element for acquiring at least one series of data from the optical sensor while the object is in movement relative to the first optical system, wherein the at least one series of data includes a plurality of apparent values of the at least one dimension,
an element for processing the at least one series of data so as to quantify the at least one dimension.

15. A method of measuring at least one dimension of an object having a first axis, the method including using a first optical system including an optical sensor and having a second axis which is an optical axis, the measuring method including:
providing the object in movement relative to the first optical system,
obtaining at least one series of data from the optical sensor while the object is in movement relative to the first optical system, wherein the at least one series of data includes a plurality of apparent values of the at least one dimension, and
processing the at least one series of data so as to quantify the at least one dimension,
wherein the movement of the object relative to the first optical system is selected from the group consisting of (i) an angular movement of the first axis relative to the second axis, (ii) a rotation of the object about the first axis, and (iii) a translation of the object along the second axis.

16. The measuring method as claimed in claim 15, wherein the movement of the object relative to the first optical system is an angular movement of the first axis relative to the second axis.

17. The measuring method as claimed in claim 15, wherein the movement of the object relative to the first optical system is a rotation of the object about the first axis.

18. The measuring method as claimed in claim 15, wherein the movement of the object relative to the first optical system is a translation of the object along the second axis.

19. A device for measuring at least one dimension of an object having a first axis, the device including:
a first optical system including an optical sensor associated with a telecentric lens having a second axis which is an optical axis,
an element for moving the object relative to the first optical system, wherein the movement of the object relative to the first optical system is selected from the group consisting of (i) an angular movement of the first axis relative to the second axis, (ii) a rotation of the object about the first axis, and (iii) a translation of the object along the second axis,
an element for acquiring at least one series of data from the optical sensor while the object is in movement relative to the first optical system, wherein the at least one series of data includes a plurality of apparent values of the at least one dimension,
an element for processing the at least one series of data so as to quantify the at least one dimension.

20. The measuring device as claimed in claim 19, wherein the element for moving the object relative to the first optical system is an element for angular movement of the first axis relative to the second axis.

21. The measuring device as claimed in claim 19, wherein the element for moving the object relative to the first optical system is an element for rotation of the object about the first axis.

22. The measuring device as claimed in claim 19, wherein the element for moving the object relative to the first optical system is an element for translation of the object along the second axis.

* * * * *